Nov. 10, 1964     I. H. VOLD     3,156,794

OMNI-DIRECTIONAL IMPACT SWITCH

Filed Dec. 26, 1962

INVENTOR.
INGEBRET H. VOLD

BY *Alfred N. Feldman*

ATTORNEY

United States Patent Office 3,156,794
Patented Nov. 10, 1964

3,156,794
OMNI-DIRECTIONAL IMPACT SWITCH
Ingebret H. Vold, Brooklyn Center, Minn., assignor to Honeywell Inc., a corporation of Delaware
Filed Dec. 26, 1962, Ser. No. 247,123
7 Claims. (Cl. 200—61.45)

The present invention relates in general to electrical switching devices and in particular to an omni-directional impact switch having a single inertial mass and a plurality of switches operable thereby.

An inertial impact switch will respond instantly to a sudden acceleration or deceleration of a predetermined magnitude. Such a device could be placed in an automobile or airplane to deenergize the ignition system upon sensing the impact of a collision. In the field of munition fuzing, an impact switch is often utilized to close a detonator circuit upon impact of the munition with the ground. The prior art discloses that the usual impact switch includes a movable seismic mass which is biased to a normal position by compressed springs or magnetic attraction. This seismic mass is often shaped in the form of a cylinder or a ball and is constrained to move through a closed chamber against the restraining force of the biasing means upon the receipt of an inertial force from the proper direction. Switch means are then provided to sense this movement of the seismic mass from its normal position. The fact that such impact switches are responsive only to inertial forces applied from a single direction is a major drawback in certain applications. Such a switch is usable only in those vehicles which always impact with the target "head first." In munitions such as grenades, which are not oriented to strike the target in one specific manner, an impact switch must be responsive to a given inertial force applied from any direction. The present invention is such a switch, being capable of performing its function upon the receipt of an inertial force from any direction.

The prior art discloses the fact that omni-directional impact switches have been built. These devices appear to be, in effect, a combination of several uni-directional impact switches mounted in a single casing. As such, they are necessarily redundant in form and do not utilize each component to its fullest capacity. In a field where miniaturization is required, a superfluity of components increases the problems involved in manufacturing the device in quantity and decreases the resulting reliability. A device which uses a plurality of springs and a plurality of seismic masses to achieve the desired omni-directional result is inherently more difficult to manufacture than a device utilizing a single seismic mass.

The device disclosed in the present invention utilizes a single seismic mass having the general configuration of two frusto-conical sections connected at the small bases. The sides of the frusto-conical sections thus define a uniform concave depression around the outer surface of the mass. The mass is held in a normal position within a cylindrical chamber having a conductive surface, by a ring of flexible spring arms each having one end mounted in a non-conductive base member at one end of the chamber. The spring arms are mounted substantially parallel to the wall of the chamber but are out of contact therewith. One group of spring arms is of flat blade-like construction while the other spring arms have a rounded protuberance formed inwardly at an intermediate point thereon. The flat spring arms and the formed spring arms are mounted alternately in an annular ring concentric with the periphery of the base member. The rounded protuberances are disposed on the concave surface of the seismic mass to prevent movement of the mass along the axis of the chamber under normal conditions. All of the spring arms are in contact with the edges of the oppositely disposed large bases of the frusto-conical sections forming the seismic mass, and thus unite to prevent lateral movement of the mass under normal conditions. Upon the receipt of an inertial force from any direction, the mass will move to drive at least one of the spring arms into contact with the walls of the chamber to complete an electric circuit. An omni-directional impact switch is thus provided which is little more complex than the ordinary uni-directional impact switch.

The unique shape of the seismic mass and the particular form of spring arm used in this invention provide accuracy which is not easily obtainable from a ball shaped mass and flat spring arm. Where a flat spring arm is used to sense longitudinal movement of the seismic mass, such being the case where a ball is forced up an inclined plane against the biasing force of a flat spring arm, the amount of force necessary to bend the spring arm a certain distance is directly related to the distance from the attached end at which the force is applied. If the lateral component of force necessary to move the spring arm could always be applied to exactly the same point on the spring arm, perfect accuracy would be achieved. In actual practice, however, the movement of the ball shaped mass in response to a component of force along the longitudinal axis of the spring arm will cause the lateral component of force to be applied at different points along the spring arm as the mass moves. This is particularly true of a ball shaped mass, since as it moves in response to a longitudinal force component, the point at which the ball makes contact with the spring arm will change, thus changing the effective length of the spring arm. The use of an "hourglass" shaped mass and a rounded protuberance on the spring arm reduces this error considerably. As the mass moves along the axis of the spring arms, the lateral component of force is applied to the tip of the protuberance and the effective length of the spring arm is changed only a slight amount. This application of the lateral component of force to the same point on the spring arm regardless of the longitudinal movement of the mass results in greater accuracy and reliability.

Another important feature of this invention is the fact that the switch will automatically reset to the normal position after the inertial force is removed. If the device should inadvertently be subjected to a shock during handling, the switch will reset and thus be available for use when needed.

The primary object of the present invention is to provide an inertial switch which will give a more accurate and uniform response to a given level of inertial force applied from any direction.

A further object is to provide an omni-directional impact switch having high reliability and good stability over a wide range of environmental conditions.

A still further object is to provide an omni-directional impact switch suitable for manufacture in miniature form at low cost and easily adaptable to a wide range of G-force requirements.

A further object is to provide an omni-directional impact switch which can be easily adjusted to respond to different levels of inertial force.

Other objects of this invention will be apparent from the specification and claims when considered in connection with the accompanying drawings in which:

Figures 1, 2, 3:
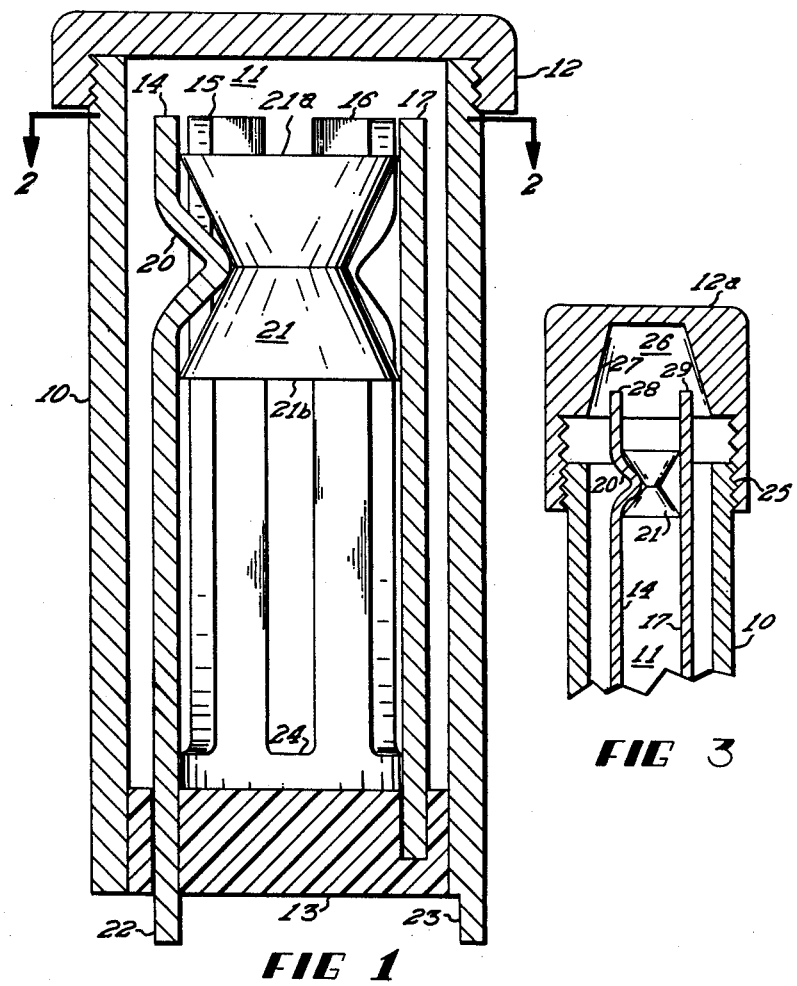
FIGURE 1 is a vertical sectional view showing the preferred embodiment of my invention.
FIGURE 2 is a view of the device taken on line 2—2 of FIGURE 1.
FIGURE 3 is a vertical sectional view of an adjustable version of the switch disclosed in FIGURE 1.

Referring now to the drawing shown in FIGURE 1, there is illustrated a 180° sectional side view of the device embodying the present invention. A casing 10 composed of a metallic conductive material forms the body of the device. Casing 10 has a cylindrical configuration and has a cylindrical chamber 11 located within. A cap 12 is connected across one end of casing 10 to close off the opening to chamber 11. Cap 12 may be either metallic or non-metallic since its only function is to prevent foreign materials from entering chamber 11. The other end of chamber 11 is filled with a non-conductive plastic material 13 which serves as a closure member for that end and as a mounting base for the contact elements located within chamber 11. A group of metallic flexible switch arms 14, 15, 16, 17 and as illustrated in FIGURES 2, 18 and 19, are mounted in an annular ring which is concentric with the periphery of base member 13. The switch arms are preferably cut from a single metallic cylinder 24 and are mounted so as to lie substantially parallel to the inner wall of casing 10. The switch arms may also be formed separately from flat sheet metal stock and mounted individually in base member 13. If so, they must be connected in base member 13 to form a single electrical connection. Switch arms 15, 17 and 19 are of flat blade-like construction while switch arms 14, 16 and 18 have a rounded protuberance formed inwardly at an intermediate point as illustrated at 20. Each switch arm should be of flat construction as shown in FIGURE 2. If the switch arms are cut from a metal cylinder, they should later be flattened so as to acquire the needed flexibility. A seismic mass 21 is located between the annularly spaced switch arms. Mass 21 is shaped in the configuration of two frusto-conical sections connected at the small bases. This "hourglass" shaped mass 21 is located so that the rounded protuberances 20 are disposed in the concave surface of the mass. Switch arm 14 is extended through base member 13 to provide an electrical contact 22 which is common to all the switch arms. Another electrical contact 23 is formed by an extension of casing 10.

Under normal gravity conditions, mass 21 is positioned as shown in FIGURE 1. The rounded protuberances on switch arms 14, 16 and 18, which are disposed on the concave surface of mass 21, prevent movement of mass 21 along the axis of the switch arms. All of the switch arms are in contact with the edge of the circular upper surface 21a and the edge of the circular lower surface 21b of mass 21, thus combining to prevent lateral movement of mass 21. If an inertial force is applied along the longitudinal axis of the switch arms, mass 21 will move along the longitudinal axis in response thereto. As mass 21 moves, the rounded protuberances of switch arms 14, 16 and 18 will be expanded outwardly under the influence of the increasing circumference of mass 21. If the inertial force is of sufficient magnitude, switch arms 14, 16 and 18 will make contact with the inner wall of casing 10 thereby completing an electric circuit from contact 22 to contact 23.

If the inertial force is received from a direction normal to the axis of the spring arms, mass 21 will move in a purely lateral direction and drive at least one of either the flat or formed spring arms into contact with the inner wall of casing 10.

If the applied inertial force is from a direction other than purely longitudinal with, or normal to the axis of the spring arms, the force can of course be broken down into longitudinal and lateral components. These force components will combine to move mass 21 and again cause at least one of the spring arms to make contact with the inner wall of casing 10.

It is apparent that the exact number of spring arms is not limited to the number shown on the drawings. To achieve the best results in any particular application it may be necessary to increase or decrease the number of spring arms or to change the combination with respect to the number of formed arms and the number of flat arms. In some applications it may also be desirable to change the dimensions of the seismic mass to obtain optimum results.

Referring now to FIGURE 3, there is disclosed an adjustable version of the switch. The basic operation of the device is unchanged from that previously described but a feature has been added which will allow the selection of the inertial force level required for a particular application. Cap 12 of FIGURE 1 has been replaced by an adjustable cap 12a. Cap 12a is connected to casing 10 by a common threaded portion 25. As cap 12a is rotated with respect to casing 10, threads 25 operate in the usual manner to raise or lower cap 12a with respect to casing 10. The interior of cap 12a is hollowed out to form a chamber 26. Chamber 26 is of circular cross-section. The diameter of the open end of chamber 26 is roughly equal to the diameter of chamber 11. The cross-sectional diameter of chamber 26 is gradually reduced so that a beveled surface 27 is disposed in close proximity to the tips 28 and 29 of the switch arms. Referring momentarily to FIGURE 2, it is noted that the tips of all the switch arms would be disposed at an equal distance from surface 27 of chamber 26. As cap 12a is raised or lowered with respect to casing 10, the distance between the tips of the spring arms and surface 27 is changed, thereby changing the amount of inertial force necessary to drive one of the spring arms into contact with surface 27. Cap 12a must be formed from an electrically conductive material so that the previously described electric circuit is completed when one of the switch arms makes contact with surface 27.

From the above description it will be apparent that I have invented an impact switch having new and more effective means of responding to an inertial force applied from any direction. Although the form of the invention described herein constitutes a preferred embodiment, it will be understood that changes may be made within the spirit of the invention limited only by the scope of the appended claims.

I claim as my invention:

1. An impact switch, comprising: a metallic body having a cylindrical chamber therein, a non-conductive closure member mounted across one end of said chamber, a plurality of flexible switch arms mounted on said closure member at spaced intervals in an annular ring concentric with the periphery of said closure member and extending longitudinally into said chamber, said switch arms being held generally parallel with the wall of said chamber but out of contact therewith, a first group of said switch arms being shaped in the form of flat blades, a second group of said switch arms being shaped in the form of flat blades with a rounded protuberance formed inwardly at an intermediate point thereon, said switch arms of said first and said second group being mounted in alternate positions in said concentric ring; and an inertial mass having the configuration of two frusto-conical sections joined at their small base, said mass thereby having a concave outer surface defined by the sides of said frusto-conical sections, said mass being constrained between said annularly spaced switch arms with said rounded protuberances disposed on said concave surface of said mass, at least one of said switch arms being forced into contact with said metallic body upon sufficient movement of said mass in any direction.

2. An omni-directional inertial switch, comprising: a metallic body having a cylindrical chamber therein, a non-conductive closure member mounted across one end of said chamber, a plurality of flexible switch arms mounted on said closure member at spaced intervals in an annular ring concentric with the periphery of said closure member and extending longitudinally into said chamber, said switch arms being held in close proximity with the wall of said chamber but out of contact therewith, a first group of said switch arms being of flat construction, a second group of said switch arms each having a protuberance formed at an intermediate point thereon, said switch arms of said first and said second group being mounted in alternate positions in said annular ring; and an inertial mass constrained between said annularly spaced switch arms with said protuberances holding said mass from movement along the axis of said chamber under normal conditions, at least one of said switch arms being forced into contact with said metallic body upon sufficient movement of said mass in any direction in response to an inertial force thereupon.

3. An inertial switch, comprising: a conductive body member having a chamber therein, a non-conductive base member mounted across one side of said chamber, a plurality of flexible switch arms mounted at spaced intervals in a substantially annular ring on said base member and extending into said chamber, said switch arms being held in close proximity to the walls of said chamber but out of contact therewith, a first group of said switch arms being shaped in the form of flat blades, a second group of said switch arms being shaped in the form of flat blades with a rounded protuberance formed inwardly at an intermediate point thereon, said switch arms of said first and said second group being mounted in alternate positions in said ring; and an inertial mass having the configuration of two frusto-conical sections joined at their small base, said mass thereby having a concave outer surface defined by the sides of said frusto-conical sections, said mass being constrained between said switch arms with said rounded protuberances disposed on said concave surface of said mass, at least one of said switch arms thereby being forced into contact with said body member upon sufficient movement of said mass in any direction.

4. An omni-directional impact switch, comprising: a base member, a plurality of flexible switch arms mounted at spaced intervals in an annular ring on said base member and extending in substantially the same direction therefrom, a first group of said switch arms being of flat construction, a second group of said switch arms each having a rounded protuberance formed inwardly at an intermediate point thereon, said switch arms of said first and said second group being mounted in alternate positions in said ring, an inertial mass having the configuration of two frusto-conical sections joined at their small base, said mass thereby having a concave outer surface defined by the sides of said frusto-conical sections, said mass being constrained between said switch arms with said rounded protuberances disposed on said concave surface of said mass; and contact means surrounding said switch arms, at least one of said switch arms being forced into contact with said contact means upon sufficient movement of said mass in any direction.

5. An omni-directional impact switch, comprising: a base member, a plurality of flexible switch arms mounted in substantially annular fashion on said base member and extending in generally the same direction therefrom, at least some of said switch arms having a rounded protuberance formed inwardly at an intermediate point thereon, an inertial mass having the configuration of two frusto-conical sections joined at their small base, said mass thereby having a concave outer surface defined by the sides of said frusto-conical sections, said mass being constrained between said annularly spaced switch arms with said rounded protuberances disposed on said concave surface of said mass; and contact means surrounding said switch arms, at least one of said switch arms thereby being forced into contact with said contact means upon sufficient movement of said mass in any direction.

6. An omni-directional impact switch, comprising: a base member, a plurality of flexible switch arms mounted on said base member and extending in substantially the same direction therefrom, at least some of said switch arms having a protuberance formed at an intermediate point thereon, an inertial mass having a concave depression formed therein, said mass being constrained between said switch arms with said protuberances positioned in said depression to hold said mass from longitudinal movement along the axis of said switch arms under normal conditions; and contact means surrounding said switch arms, at least one of said switch arms being forced into contact with said contact means upon sufficient movement of said mass in any direction in response to an inertial force thereupon.

7. An adjustable omni-directional impact switch, comprising: a metallic body having a cylindrical chamber therein, said chamber having a first open end and a second open end, a non-conductive closure member mounted across said first end, a plurality of flexible switch arms mounted on said closure member at spaced intervals in an annular ring concentric with the periphery of said closure member and extending longitudinally through said chamber so as to protrude from said second end, said switch arms being held generally parallel with the wall of said chamber but out of contact therewith, a first group of said switch arms being shaped in the form of flat blades, a second group of said switch arms being shaped in the form of flat blades with a rounded protuberance formed inwardly at an intermediate point thereon, said switch arms of said first and said second group being mounted in alternate positions in said concentric ring, an inertial mass having the configuration of two frusto-conical sections joined at their small base, said mass thereby having a concave outer surface defined by the sides of said frusto-conical sections, said mass being constrained between said annularly spaced switch arms with said rounded protuberances disposed on said concave surface of said mass; and a threaded metallic cap adjustably mounted on said second end so as to be longitudinally adjustable with respect to said body, said cap having a concave depression of circular cross-section formed therein concentric with said chamber and adjacent thereto, the diameter of said depression being gradually reduced in the direction away from said chamber thereby providing a beveled contact surface surrounding said protruding switch arms, at least one of said switch arms being forced into contact with said surface upon sufficient movement of said mass in any direction in response to an inertial force applied thereto, the amount of inertial force required being variable with respect to the distance of said surface from said switch arms.

References Cited in the file of this patent

UNITED STATES PATENTS

| | | |
|---|---|---|
| 2,741,674 | Richard | Apr. 10, 1956 |
| 3,001,039 | Johnson | Sept. 19, 1961 |
| 3,031,545 | Waller | Apr. 24, 1962 |